(12) United States Patent
Kothera et al.

(10) Patent No.: US 8,573,534 B2
(45) Date of Patent: Nov. 5, 2013

(54) FLUIDIC ARTIFICIAL MUSCLE ACTUATION SYSTEM FOR TRAILING-EDGE FLAP

(75) Inventors: Curt Kothera, Crofton, MD (US); Norman M Wereley, Potomac, MD (US); Benjamin K. S. Woods, Barnesville, MD (US)

(73) Assignees: Techno-Sciences, Inc., Calverton, MD (US); University of Maryland, College Park, College Park, MD (US)

( * ) Notice: Subject to any disclaimer, the term of this patent is extended or adjusted under 35 U.S.C. 154(b) by 412 days.

(21) Appl. No.: 13/097,623

(22) Filed: Apr. 29, 2011

(65) Prior Publication Data

US 2011/0266391 A1 Nov. 3, 2011

Related U.S. Application Data

(60) Provisional application No. 61/329,338, filed on Apr. 29, 2010.

(51) Int. Cl.
    *B64C 3/38* (2006.01)

(52) U.S. Cl.
    USPC ............................... 244/99.2; 92/92

(58) Field of Classification Search
    USPC .............. 244/99.5, 99.2, 99.3; 92/92, 90
    See application file for complete search history.

(56) References Cited

U.S. PATENT DOCUMENTS

| | | | |
|---|---|---|---|
| 2,415,128 A * | 2/1947 | Eaton | 244/226 |
| 2,789,580 A | 4/1957 | Woods | |
| 2,844,126 A | 7/1958 | Gaylord | |
| 4,615,260 A | 10/1986 | Takagi et al. | |
| 4,733,603 A * | 3/1988 | Kukolj | 92/92 |
| 4,751,869 A | 6/1988 | Paynter | |
| 5,067,390 A * | 11/1991 | Negishi | 92/48 |
| 5,201,262 A * | 4/1993 | Negishi et al. | 92/92 |
| 6,349,746 B1 | 2/2002 | Bergemann et al. | |
| 7,055,782 B2 * | 6/2006 | Dittrich | 244/219 |
| 7,837,144 B2 | 11/2010 | Kothera et al. | |
| 8,127,659 B2 * | 3/2012 | Okazaki | 91/358 R |
| 2009/0301292 A1 | 12/2009 | Woods | |

OTHER PUBLICATIONS

Leishman, J., The Helicopter Thinking Forward, Looking Back, College Park Press, 2007, pp. 101-102.
Niezrecki, C., Brei, D., et al., "Piezoelectric Actuation: State of the Art," The Shock and Vibration Digest, 2001, vol. 33, 269.

(Continued)

*Primary Examiner* — Christopher P Ellis
(74) *Attorney, Agent, or Firm* — Ober, Kaler, Grimes & Shriver; Royal W. Craig

(57) ABSTRACT

An actuation system for trailing-edge flap control suitable for use in reducing vibration in rotorcraft blades as well as primary flight control and noise mitigation employing an antagonistic pair of fluidic artificial muscles (FAMs) located and operated inside the rotor blade. The FAMs are connected to a force transfer mechanism such as an inboard bellcrank and engaged to an outboard bellcrank by one or more linkages running spanwise out through the spar. The outboard mechanism translates the spanwise linkage motion into chordwise motion of a flap control rod which is connected to the trailing-edge flap. A torsion rod flexure (TRF) device is included connecting the trailing-edge flap to the blade. The actuation system can produce large flap deflections at relatively high operating frequencies for vibration reduction and noise cancellation and is capable of larger flap deflections at lower operating frequencies for embedded primary control of the rotorcraft.

32 Claims, 5 Drawing Sheets

(56) References Cited

OTHER PUBLICATIONS

Straub et al., "Development and whirl tower test of the SMART active flap rotor," SPIE intl. Symposium in Smart Structures and Materials, Mar. 14-18, 2004, San Diego, CA.

Dieterich et al., "Trailing Edge Flaps for Active Rotor Control Aeroelastic Characteristics of the ADASYS Rotor System" American Helicopter Society 62th Annual Forum, May 9-11, 2006, Phoenix, Arizona, USA.

* cited by examiner

FLUIDIC ARTIFICIAL MUSCLE ACTUATION SYSTEM FOR TRAILING-EDGE FLAP

CROSS-REFERENCE TO RELATED APPLICATION(S)

The present application derives priority from provisional application 61/329,338, filed on Apr. 29, 2010 which is incorporated herein by reference.

BACKGROUND OF THE INVENTION

1. Field of the Invention

The present invention relates generally to aerodynamic control systems and, more particularly, to a system for providing active individual fluid foil control for primary flight control and maneuverability, vibration reduction and noise reduction via a trailing-edge flap.

2. Description of Prior Art

There has been much interest recently in the use of trailing-edge flap (TEF) systems for rotorcraft to provide active individual blade control for vibration reduction. It is possible to provide higher harmonic control of each helicopter rotor blade by directly mitigating the vibrations created by time varying forces and moments. It is also possible to accomplish these results using the same actuation system as is used for primary control of the aircraft. A dual-function actuation system would allow for elimination of the swashplate with its significant drag, complexity, and maintenance penalties. Leishman, J., The Helicopter Thinking Forward, Looking Back, College Park Press, 2007, pp. 101-102.

One of the challenges to realizing these goals is the lack of an appropriately scaled actuation system. The small size and high centrifugal loads experienced in helicopter main rotor blades makes for a highly constrained design space. The challenge is made even more difficult by the need to minimize the weight of any such system. Conventional hydraulic or pneumatic cylinders are heavy, require considerable space, and, in any event, cannot attain the control frequencies necessary for vibration reduction. Consequently, there has been considerable interest in the use of smart materials as the driving elements of these systems.

Piezoelectrics, electrostrictives, magnetostrictives, and shape memory alloys have all been investigated as possible replacements for conventional fluid driven control systems for fixed wing and rotary aircraft. Piezoelectric systems have attracted the most attention and have been the most successful to date. Niezrecki, C., Brei, D., et al., "Piezoelectric Actuation: State of the Art," The Shock and Vibration Digest, 2001, Vol. 33, 269. A full-scale whirl test and the first ever flight test of a smart rotor equipped helicopter have recently taken place with piezo-based active flap systems. See, Straub et al., "Development and whirl tower test of the SMART active flap rotor," SPIE intl. Symposium in Smart Structures and Materials, San Diego, Calif., Mar. 14-18, 2004; Dieterich et al., "Trailing Edge Flaps for Active Rotor Control Aeroelastic Characteristics of the ADASYS Rotor System" American Helicopter Society 62th Annual Forum, Phoenix, Ariz., USA, 9-11 May 2006. Unfortunately, piezoelectrics are known to suffer from some inherent limitations including, among others, their small actuation strains (<0.2%), brittleness, and high cost. More importantly for present purposes, piezoelectrics have insufficient actuation authority for primary control of full-scale rotor systems.

Another possibility that has shown promise is Fluidic Artificial Muscles (FAMs). Fluidic artificial muscles (also known as artificial muscle actuators, or McKibben artificial muscles, among other names), are simple mechanical actuators that harness pressurized fluid (air, water, oil, etc.) to generate significant forces and deflections. Fluidic artificial muscles commonly comprise an inner elastomeric fluid bladder that is sealed on each end to allow for pressurization and surrounded by a stiff braided sleeve, though co-cured bladder-braid, layered helical windings, and straight fibers are also options for sleeve design.

In operation, pressurization of the inner elastic bladder will produce either contractile or extensile force and motion due to the interaction with the braided sleeve. The bladder is pressurized with an operating fluid such as air or oil causing an inflation and expansion of the bladder and the braided sleeve which surrounds it. The fixed length of the stiff sleeve fibers generates a contractile or extensile force along the main axis of the actuator in addition to relative motion between the two end fittings. The direction of force and motion is dependent on the initial angle between the filaments of the braided sleeve. For a contractile actuator, the bladder expansion is radial, whereas for an extensile actuator the bladder expansion is primarily axial. The generated force and motion is transferred to an external system via the end fittings. Fluidic artificial muscle actuators of this type have been known in prior patent publications. A related device was disclosed in April 1957 in U.S. Pat. No. 2,789,580. Many different designs have been disclosed over the years (U.S. Pat. Nos. 2,844,126, 4,615,260, 4,733,603, 4,751,869, 4,733,603 and 6,349,746), but only in the context of robotics or industrial automation, not aerospace engineering. The latter has only recently become a viable application due to advances in FAM design that enable lighter weight and higher fatigue life. See, for example, Applicants' co-pending application publication no. 2009/0301292 which is incorporated herein by reference in its entirety and recently issued U.S. Pat. No. 7,837,144 also incorporated herein by reference.

SUMMARY OF THE INVENTION

In accordance with the foregoing objects, an actuation system for trailing edge flap control is disclosed. For illustrative purposes only the actuation system will be discussed in the context of a helicopter main rotor blade. It will be understood that the exemplary embodiment is not intended to be limiting and that system can be used in other fluid foils, lifting surfaces and control surfaces having trailing-edge flaps. In the exemplary embodiment the system employs an antagonistic pair of fluidic artificial muscles (FAMs) at the root end of the rotor blade with one end of each FAM rigidly mounted to the blade structure while the second, moving end is attached by a mechanical linkage running spanwise through the hollow spar section of the blade to the trailing-edge flap. A second mechanical linkage translates the spanwise motion and force of the first linkage into chordwise motion of a flap control rod which is connected to and actuates the flap. In the preferred embodiment a torsion rod flexure (TRF) device is included as part of the flap hinge.

The actuation system produces substantially high frequency flap deflections for vibration reduction in rotorcraft, and specifically up to ±10° of flap deflection at maximum rotor frequency of (N+1)/rev, where N is the number of rotor blades. It is also capable of larger flap deflections at 1/rev for embedded primary control of the rotor and lesser deflections at even higher frequencies for noise mitigation.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

A flight control system for providing active individual trailing-edge flap control for vibration reduction, primary control, and noise cancellation using fluidic actuators is disclosed. The actuation system was developed with two primary design goals; first, to produce relatively large flap deflections at frequencies for vibration reduction in rotorcraft, and specifically up to ±10° of flap deflection at maximum rotor frequency of (N+1)/rev, where N is the number of rotor blades; and second, to produce even larger flap deflections at the 1/rev rotor frequency to demonstrate the ability to satisfy the requirements for embedded primary control of the rotor. While the exact deflection levels needed for primary control are dependent on a wide range of factors such as flap sizing, blade torsional stiffness, flight condition, blade index angle, etc., it is considered that deflections on the order of ±15° to ±20° at 1/rev are suitable for primary rotor control. Smaller flap deflection angles intended for vibration and/or noise control applications are also producible at even higher frequencies with this system.

Figure 1:
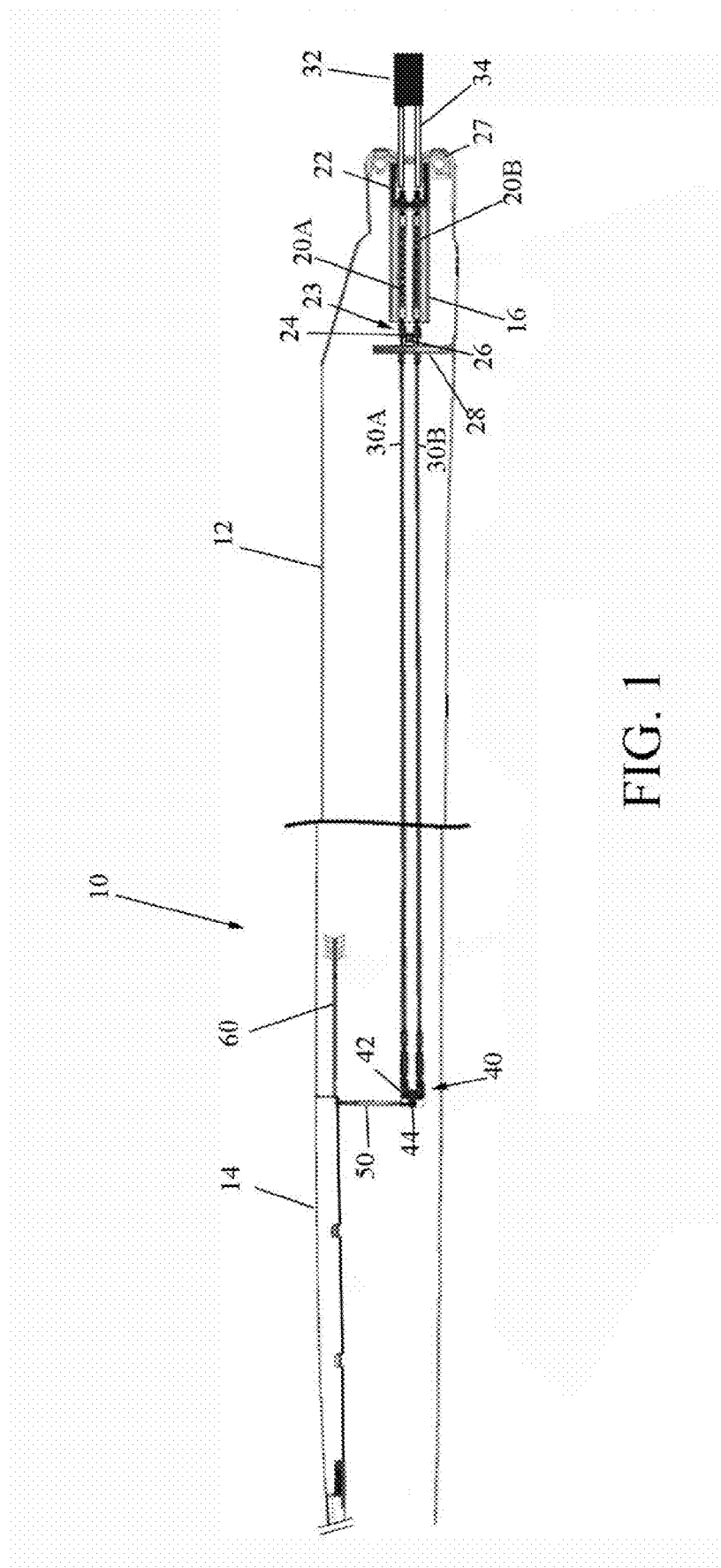
FIG. 1 is a top schematic view of the flight control system 10 of the present invention.
Figure 2:
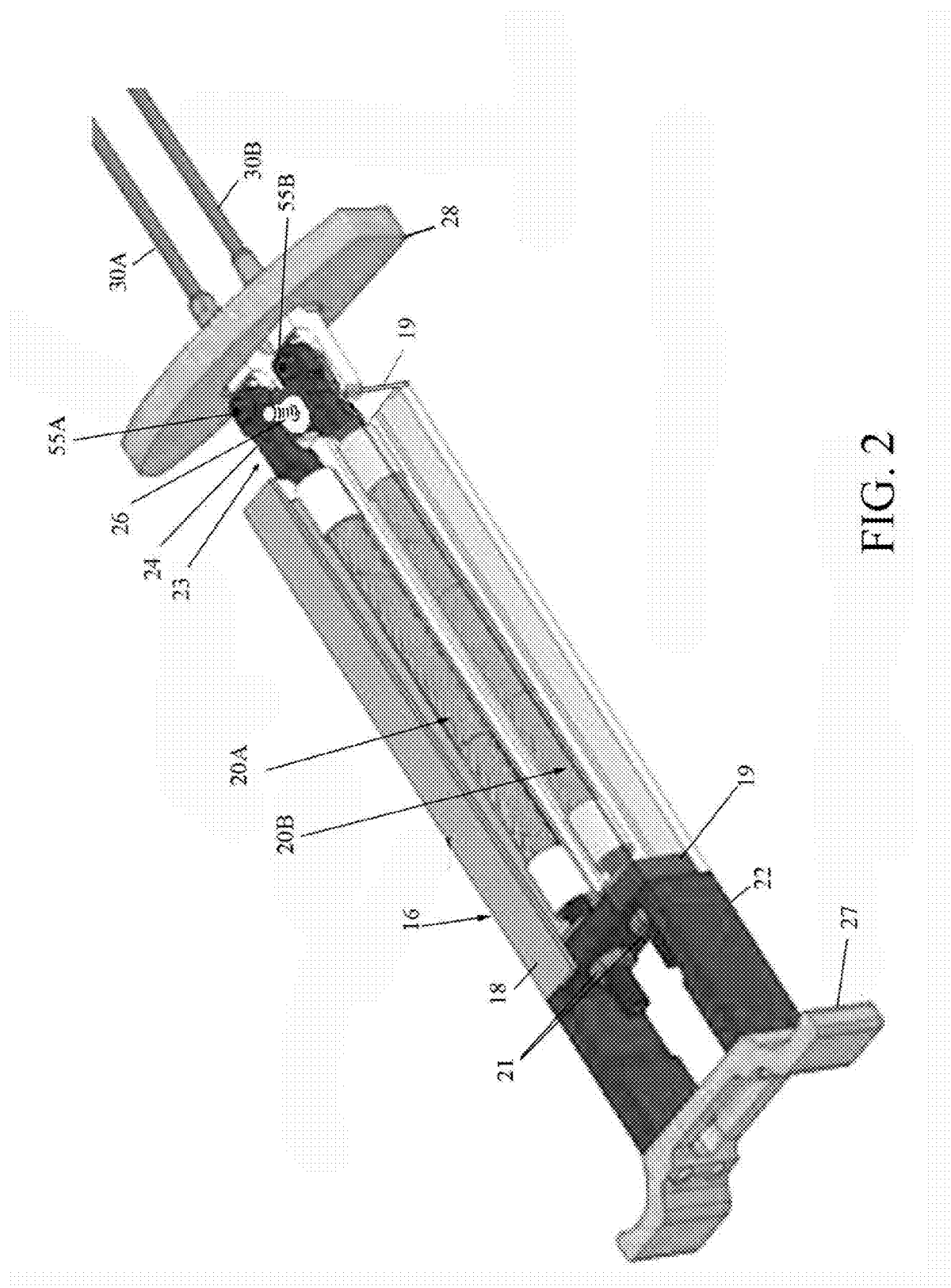
FIG. 2 is a top perspective view of the inboard portion of the flight control system 10 of FIG. 1.

With reference to FIGS. 1 and 2, a flight control system 10 according to the present disclosure is incorporated into a helicopter rotor blade 12. The illustrated rotor blade 12 is of a typical planform and a trailing-edge flap 14 is positioned at an outboard location near the blade tip. This flap configuration is generally consistent with other active flap systems and one skilled in the art will, as noted, readily understand that the present control system is suitable for use in any of a variety of rotor blades as well as other vehicular and non-vehicular fluid control surfaces having trailing-edge flaps. An antagonistic pair of fluidic artificial muscles (FAMs) 20A, 20B are mounted and contained within an actuator cartridge 16 at the inboard root end of the rotor blade 12.

As best seen in FIG. 2 the actuator cartridge 16 is a shroud 18 (shown partially cutaway) bounded by end plates 19. The input nozzles 21 of the FAMs 20A, 20B protrude through the inboard end plate 19 of the actuator cartridge 16 and are secured to the inner end plate 19 by fastening components. The stationary nozzle end protruding from the actuator cartridge 16 through the end plate 19 is further fixedly connected through a mounting bracket 22. The mounting bracket 22 is formed with a pair of spaced-apart legs which define a void that protects the FAM 20A, 20B input nozzles 21 and affords a space for connection of the fluidic hoses 34. The mounting bracket 22 is in turn fixedly connected to a mounting plate 27 at the root end of the blade 12. The mounting plate 27 is formed with an aperture into the void of the mounting bracket 22 for passing the fluidic hoses 34 from the input nozzles 21 to valve 32 (not shown in FIG. 2).

Referring back to FIG. 1, the FAMs 20A, 20B are controlled by a valve 32 coupled by a corresponding pair of fluid hoses 34 to the stationary ends of the input nozzles 21 protruding from the actuator cartridge 16. The valve 32 used for actuation of the FAMs 20A, 20B may, preferably, be a proportional spool valve although other fluid control valves such as direct-acting solenoid valves, diaphragm valves, etc. may also be utilized. The spool type valve has a variable orifice size that is controllable by input voltage and additionally, may be a 5/3-way valve that automatically switches which of FAM actuators 20A, 20B is being pressurized and which is being exhausted. The spool valve 32 has a proportional output that allows for more sophisticated control options. Alternatively to using a single, coupled control valve 32, it may be preferred to have independent control of each FAM 20A, 20B, wherein each FAM would have its own dedicated control valve 32, such as the described proportional 3-way type. Air control system redundancy may also be preferred, wherein each control valve 32 has at least one back-up valve included in the fluid circuit design in case of a failure.

Figure 4:
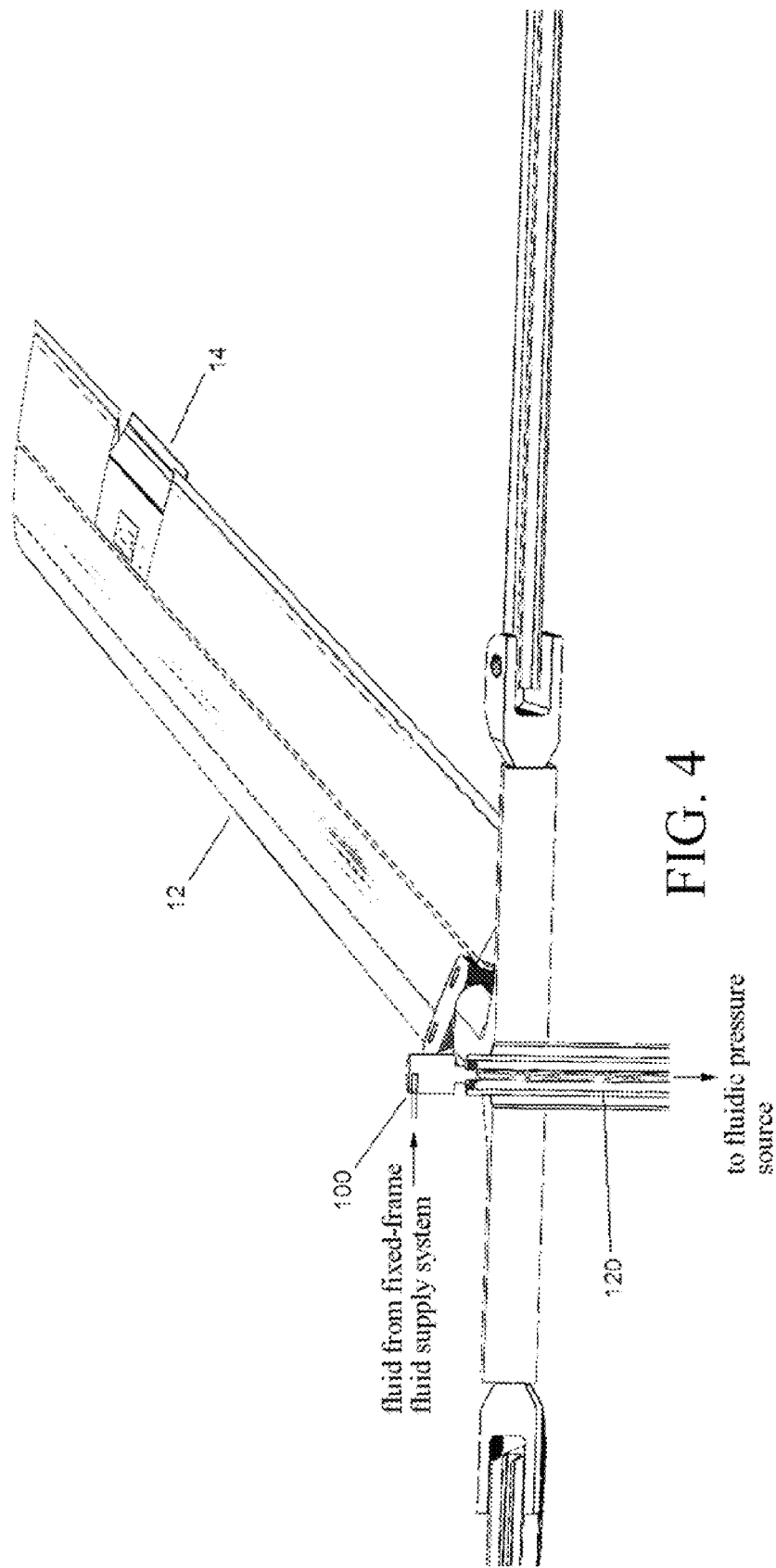
FIG. 4 is a cutaway perspective view of an exemplary rotor hub design.

The control valve 32 may be mounted on a rotating frame in the main rotor hub atop the main mast. As seen in FIG. 4, fluid is fed to it from a fixed-frame fluid supply system via a rotary union joint 100 (slip ring). In a more compact, alternate embodiment, the valve 32 may be integrably and directly attached to the nozzle ends of the FAMs 20A and 20B thereby eliminating the need for excess fluid hoses. The rotary union 100 is mounted on a standpipe 120 that coincides with the axis of rotation, and this union 100 supplies pressurized fluid from the fixed frame to the rotating frame for distribution to the FAM actuators 20A, 20B. In an alternate embodiment, the rotor hub may include an integral air/fluid compressor system to generate pressure in the rotating frame to supply the FAMs via the valve 32.

Referring back to FIG. 2, opposite their fixed, nozzle end, the FAMs 20A, 20B each have a movable end oppositionally connected to a force mechanism for actuating the trailing edge flap 14. In the depicted embodiment the mechanism includes a bellcrank 23 having an angle arm 24 pivotally mounted on a hinge 26 ("bellcrank" being defined as a rocker having two arms meeting at a pivot). The hinge 26 is itself mounted to a bracket 28 attached within the structure of the blade 12, such as, for example, the backend of the blade's spar or a rib. The angle arm 24 is preferably "H"-shaped (at 0 degrees rotation) with opposing side members joined to a center cross-member, the cross-member being pivotally mounted to hinge 26. Each FAM 20A, 20B is affixed on one side of the "H" to a corresponding side member of angle arm 24. The angle arms 2 continue on the other side of the "H" to a corresponding side member of linkages 30A, 30B which pass through the spacer bracket 28 and are pivotally attached to the opposite ends of the angle arm 24 side members at pivotal couplings 55A, 55B.

In practice, a triangle is formed with an inboard vertex at hinge 26 and two outboard vertices at pivotal couplings 55A, 55B. The two outboard vertices 55A and 55B pivotally connect the FAM actuators 20A and 20B to their respective linkages 30A and 30B in a location that may or may not be coincident. The angle arm 24 pivots about hinge 26 and the output torque and motion is transferred by linkages 30A, 30B out through aperture(s) in spacer bracket 28. The inboard bellcrank 23 converts the contractile forces from the FAMs 20A, 20B into a moment about the hinge 26 and uses kinematic modifications (e.g. variations in bellcrank moment arm length) to tailor torque output applied to and deflection angle of the trailing-edge flap 14. The output torque and motion is transferred to the outboard mechanical assembly (and ultimately to the flap 14) by linkages 30A, 30B that extend through the hollow spar. Note that, as depicted, the outboard mechanical assembly engages the flap 14 at its inboard end although this need not be so and the motive force transfer could take place at any preferred location along the length of the flap (e.g., the mid-span location) without change to the present mechanisms.

Figure 3:
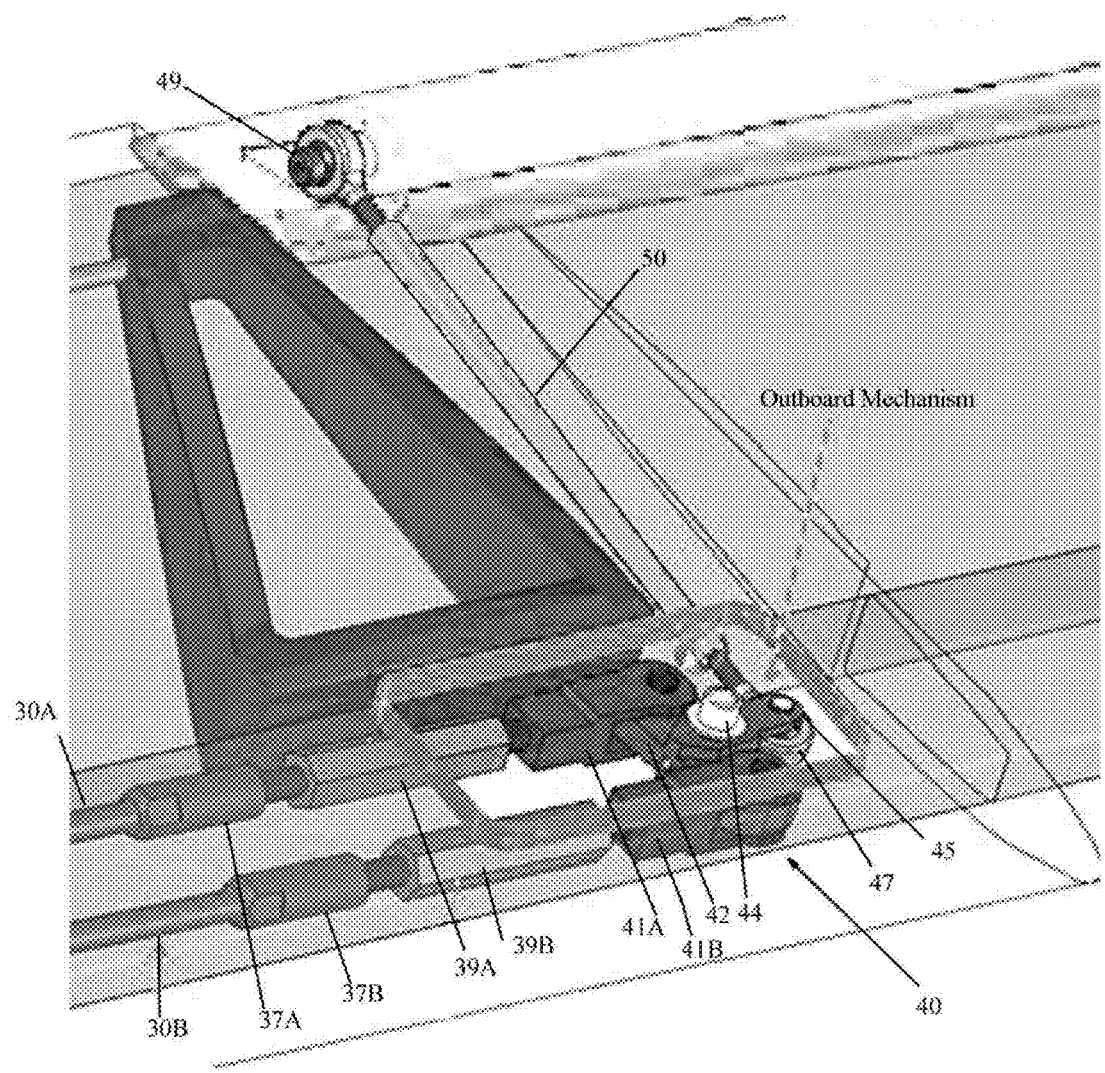
FIG. 3 is a top perspective view of the outboard portion of the flight control system 10 of FIG. 1.

With reference to FIG. 3, the linkages 30A, 30B pass through the spacer bracket 28 on their way to the outboard mechanical assembly and are connected in the depicted embodiment to a second bellcrank 40 at their outboard ends. The linkages 30A, 30B may be tendons, rods or the like, but are designed and integrated for primarily carrying tensile loads. The outboard bellcrank 40, like the inboard, comprises an angle arm 42 pivotally mounted on a hinge 44 fixed within the blade structure. The outboard bellcrank 40 translates the spanwise motion of the linkages into chordwise motion of a flap control rod 50 which is connected to flap 14. As with the inboard bellcrank, the outboard bellcrank provides an opportunity to introduce kinematic modification into the actuation system design to tailor the force applied to the flap 14 along with the rate and degree of deflection. The flap control rod 50 exits the blade spar through the blade skin and is pivotally coupled to a control horn 49 on the flap 14 (as will be described).

At their outboard end, the linkages 30A, 30B are preferably terminated in yokes 41A, 41B which are pivotally connected to opposing sides of the angle arm 42 of the outboard bellcrank 40. Linkages 30A, 30B are preferably connected to the yokes by screw collars 37A, 37B so as to be length adjustable in combination with turnbuckles 39A, 39B so as to allow a degree of length adjustment/tightening/tensioning of the linkages. Angle arm 42 is pivotally seated on hinge 44 and extends a yoke 45 forward (outboard). The yoke 45 is pivotally connected by a coupling 47 to the proximal end of the flap control rod 50 which extends in a substantially orthogonal direction (e.g., chordwise) to the flap 14 at its distal end. In this way, rotation of the outboard bellcrank 40 due to spanwise motion of the linkages is translated into chordwise motion of flap control rod 50. The flap control rod 50 is pivotally connected to flap 14 via a control horn 49 on the flap 14 which levers the flap 14 up and down. Although depicted on the external surface of the flap 14, alternate embodiments contain the control rod 50 and control horn 49 inside the airfoil profile.

In order to eliminate the need for bulky thrust bearings at the thin trailing-edge flap 14 mounting points, a torsion rod flexure (TRF) mounting device 60 is preferred. The torsion rod flexure (TRF) device 60 is a thin rod that is aligned substantially spanwise and anchored on one end to the blade 12 and on the other to the flap 14, therefore providing a direct structural connection capable of transferring the considerable centrifugal loads on the flap 14 into the blade 12 structure without the need for thrust bearings. Additionally, this TRF device 60 has minimal torsional stiffness (it can be twisted), so that deflections of the flap 14 may be achieved through elastic twisting of the TRF device 60.

The FAMs 20A, 20B of the system 10 are preferably constructed in accordance with the present inventors' co-pending application Ser. No. 12/456,139 filed Jun. 11, 2009 which is incorporated herein by reference in its entirety. FAMs 20A, 20B comprise four basic parts: an inner elastomeric bladder (e.g. latex tubing); an outer helically braided sleeve; and a fitting at each end to seal the actuator and allow for transfer of the forces and motion. For contractile FAMs, the inner bladder is pressurized with fluid, causing an inflation and expansion of the bladder diameter. The braided sleeve around the bladder is thereby forced to expand radially. However, the fixed length of the stiff sleeve fibers generates a contractile force and displacement along the main axis of the FAM. This force and motion is transferred to the system via the end fittings.

Due to their contractile motion, FAMs 20A, 20B are essentially uni-directional actuators. Bi-directional actuation may be achieved by pre-biasing a FAM with a spring and operating it against the spring load. Alternatively, as depicted in the illustrated (preferred) embodiment, dual FAMs 20A, 20B are used in an antagonistic pair because this approach has the added benefit of allowing for control of both position and stiffness about the hinge. In an antagonistic arrangement, the two FAMs 20A, 20B cause output deflection only when one is pressurized differentially with respect to the other by valve 32 to generate bi-directional motion. The antagonistic FAM configuration is also preferred for the present trailing-edge flap system 10 because it allows for a neutral state (i.e. no pressure in either FAM 20A, 20B) at the center of their output range, which correlates to a flap 14 angle of zero degrees. Additionally, the antagonistic arrangement has the benefit of allowing adjustment of the hinge stiffness by overlaying a bias pressure to both FAMs 20A, 20B. Increasing pressure in both FAMs increases the force in both without changing the differential pressure, which causes an effective increase in hinge stiffness without varying flap 14 angle.

In order to maintain large deflection angles at higher frequencies, the design of the fluidic supply system is very important. Given the antagonistic configuration of this system 10, bi-directional operation requires two FAM fill and exhaust cycles per flap cycle, one for each FAM 20A, 20B as it is actuated in turn. Therefore the fluidic supply system, connected to the FAMs through control valve 32, effectively has to fill and exhaust the volume of one FAM and the length of tubing 34 at a rate of 70 Hz for 35 Hz flap actuation, for example. To accomplish this, high flow rate control components and large orifices and tubing 34 can be used. In addition, the size of FAMs 20A, 20B can be optimized. An efficient fluid source is also important.

Figure 5:
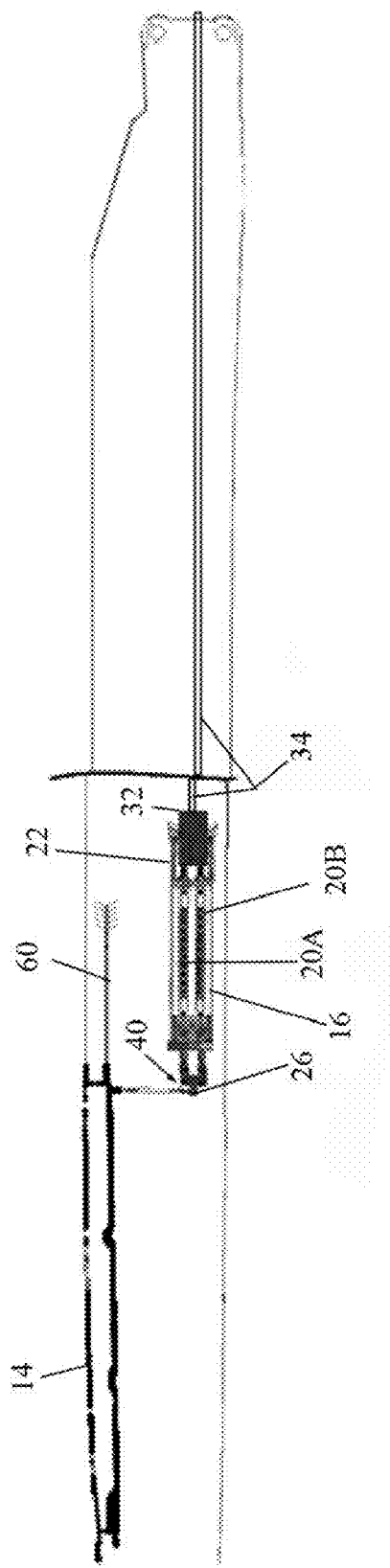
FIG. 5 illustrates an alternate configuration in which the actuator cartridge 16 and all associated components are moved away from the root end of the rotor blade 12 to a more outboard location.

FIG. 5 illustrates an alternate configuration in which the actuator cartridge 16 and all associated components are moved away from the root end of the rotor blade 12 to a more outboard location that co-locates the cartridge 16 with the chordwise connection to the flap 14. The fluidic control valve 32 is coupled by an extended pair of hoses 34 which pass through the spar to the stationary nozzle ends protruding from the actuator cartridge 16. The pair of linkages 30A, 30B of FIG. 1 are effectively eliminated and take the form of a simple, direct hardware connection (such as, for example, a yoke), a bracket or the like, and only a single outboard bellcrank 40 is used. Other alternative embodiments also eliminate the inboard bellcrank. In one such embodiment the linkages 30A, 30B are provided in the form of a pair Bowden cables (a type of flexible cable used to transmit mechanical force or energy by the movement of an inner cable within a sheath). The sheathing of each cable is affixed to the bracket 28 by a fitting while the cable itself is secured, one each, to a free end of the FAMs 20A, 20B. A barrel adjuster is provided to adjust the sheathing length and thus cable tension. In yet another embodiment eliminating the inboard bellcrank, the linkages 30A, 30B are provided in the form of rods. The rod linkages are secured in a series of linear or slide bearings, such that they are permitted to slide spanwise in the blade 12 but are restricted from movement in any other direction. Each rod is affixed at its in-board end to one the FAMs 20A, 20B and operated in tension to actuate the outboard bellcrank as described above.

In yet another embodiment, the FAMs 20A, 20B are substantially coaxially positioned within the spar. In such an embodiment, the outboard FAM is rotated 180 degrees so that its free/moveable end is inboard of its fixed end and proximal to the free end of the inboard FAM which is positioned as depicted in the preferred embodiment. The proximal ends of the FAMs may be fixed to a single rod type linkage retained in a series of slide bearings as described in the previous alternative embodiment but for push-pull operation of the outboard bell crank. In such a configuration, the opposing pull-pull operation of the inboard and outboard FAMs, respectively, is translated into pull-push of the outboard bellcrank by the rod sliding in the bearings. Such an embodiment may also be utilized with a bellcrank between the opposing ends of the coaxial FAMs in which both FAMs are engaged to an arm on one side of the pivot point while the two linkages are engaged on opposing sides of the pivot point from one another. In any such an embodiment utilizing cable actuation, the bellcrank may be provided in the form of a disc of continuously variable radius/diameter. The cable is engaged with the edge of the disc such that, as the disc rotates, the point of engagement of the cable with the edge of the disc changes and the effective moment arm of the disk is continually altered with the change in radius/diameter. Such a variable diameter disc provides considerable control of the kinematic operation of the flap.

The above-described embodiments of the flap actuation system are capable of producing substantially high frequency flap deflections for vibration reduction in rotorcraft, and specifically up to ±10° of flap deflection at maximum rotor frequency of (N+1)/rev, where N is the number of rotor blades. They are also capable of larger flap deflections at 1/rev for embedded primary control of the rotor and lesser deflections at even higher frequencies for noise mitigation. Although shown in the context of trailing edge flap control for a helicopter rotor blade, the system can be used for control of other fluid foils, lifting surfaces and control surfaces having trailing-edge flaps.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. In a fluid foil having a trailing-edge flap, an actuation system for moving said flap, comprising:
    a fluidic pressure source
    a first fluidic artificial muscle (FAM) actuator mounted in said fluid foil and operatively coupled to said fluid pressure source;
    a second fluidic artificial muscle actuator mounted in said fluid foil and operatively coupled to said fluid pressure source;
    a first linkage coupled at a proximal end to said first FAM actuator and extending therefrom in a spanwise direction;
    a second linkage coupled at a first end to said second FAM actuator and extending therefrom in a spanwise direction;
    a bellcrank pivotally affixed within said fluid foil, said first linkage engaged at a distal end to a first moment arm of said bellcrank and said second linkage engaged at a distal end to a second moment arm of said bellcrank oppositional to said first linkage; and
    a transfer arm connected from a third moment arm of said bellcrank to said trailing-edge flap;
    whereby differential pressurization of said first FAM actuator and said second FAM actuator causes said flap to rotate in a first direction when the fluidic pressure in said first FAM actuator exceeds the fluidic pressure in said second FAM actuator and rotating in a second direction when the fluidic pressure in said second FAM actuator exceeds the fluidic pressure in said first FAM actuator.

2. The actuation system of claim 1, whereby differential pressurization of said first FAM actuator and said second FAM actuator causes said flap to move in a first direction when the fluidic pressure in said first FAM actuator exceeds the fluidic pressure in said second FAM actuator and to move in a second direction when the fluidic pressure in said second FAM actuator exceeds the fluidic pressure in said first FAM actuator.

3. The actuation system of claim 1, further comprising a force transfer mechanism in said fluid foil, said transfer mechanism coupling said first linkage to said first FAM actuator and said second linkage to said second FAM actuator.

4. The actuation system of claim 3, wherein said force transfer mechanism is a second bellcrank pivotally mounted in said fluid foil, said first FAM actuator and said first linkage engaged to a first arm of said second bellcrank and said second FAM actuator and said second linkage engaged to a second arm of said second bellcrank.

5. The actuation system of claim 4, wherein said first linkage and said second linkage are selected from the group consisting of a cable, a chain, a rope, a tube, and a rod.

6. The actuation system of claim 3, wherein said first linkage is a rod and said second linkage is a rod.

7. The actuation system of claim 6, wherein said force transfer mechanism includes a slide further comprising a plurality of linear bearings mounted in said fluid foil, said linear bearings supporting said first rod linkage and said second rod linkage.

8. The actuator system of claim 1, further comprising at least one control valve operatively engaged between said fluidic pressure source and said first and second FAM actuators.

9. The trailing-edge flap actuator according to claim 8, wherein said at least one control valve comprises a proportional spool valve.

10. The trailing-edge flap actuator according to claim 9, wherein said proportional spool valve has a variable orifice size controllable by input voltage.

11. The trailing-edge flap actuator according to claim 9, wherein said proportional spool valve is a 5/3-way valve for simultaneously depressurizing one of said FAM actuators while pressurizing the other of said FAM actuators.

12. The actuation system of claim 1, further comprising a torsion rod flexure (TRF) device pivotally connecting said trailing-edge flap to said fluid foil.

13. A trailing-edge flap actuator for a fluid contact surface, comprising:
    a fluidic pressure source;
    a first fluid actuator operatively coupled to said fluid pressure source, said first fluid actuator having a first end fixedly mounted in said fluid contact surface and a second end moveable relative to said first end; and
    a second fluid actuator operatively coupled to said fluid pressure source, said second fluid actuator having a first end fixedly mounted in said fluid contact surface and a second end moveable relative to said first end;

a force transfer mechanism having at least one force input coupled to said fluid actuators and one force output; and a first linkage connected to said force output and operatively driving said trailing-edge flap;

whereby differential pressurization of said first FAM actuator and said second FAM actuator by said fluidic source causes said flap to rotate, said flap rotating in a first direction when the fluidic pressure in said first FAM actuator exceeds the fluidic pressure in said second FAM actuator and rotating in a second direction when the fluidic pressure in said second FAM actuator exceeds the fluidic pressure in said first FAM actuator.

14. The trailing-edge flap actuator of claim 13, wherein said force transfer mechanism comprises a bellcrank; and said at least one force input of said bellcrank comprises a first moment arm coupled to said second end of said first fluid actuator and said second end of said second fluid actuator; and said force output is a second moment arm coupled to said linkage.

15. The trailing-edge flap actuator of claim 14, wherein said force transfer mechanism further comprises a slide, and said slide comprises a rod slideably retained within said fluid contact surface and coupled at a first end to said second end of said first fluid actuator and said second end of said second fluid actuator and coupled at a second end to said first moment arm.

16. The trailing-edge flap actuator of claim 14, wherein said at least one force input of said bellcrank further comprises a second moment arm, said first moment arm being coupled to said second end of said first fluid actuator and said second moment arm being coupled to said second end of said second fluid actuator.

17. The trailing-edge flap actuator of claim 16, further comprising a second linkage engaged on a proximal end to said second end of said first actuator and on a distal end to said first moment arm; and a third linkage engaged on a proximal end to said second end of said second actuator and on a distal end to said second moment arm.

18. The trailing-edge flap actuator of claim 13, wherein said linkage is connected to a transfer arm pivotally mounted inside said trailing-edge flap.

19. The trailing-edge flap actuator of claim 18, wherein said transfer arm is coupled to said trailing-edge flap.

20. The trailing-edge flap actuator of claim 19, wherein said transfer arm is coupled to said trailing-edge flap by a second linkage non-parallel relative to said first linkage.

21. The trailing-edge flap actuator of claim 13 wherein said trailing-edge flap is pivotably mounted to said fluid contact surface by a torsion rod flexure (TRF) mounting device.

22. The trailing-edge flap actuator of claim 13 further comprising at least one control valve operatively engaged between said fluidic pressure source and said first and second fluid actuators.

23. The trailing-edge flap actuator of claim 22, wherein said control valve comprises a proportional spool valve.

24. The trailing-edge flap actuator of claim 23, wherein said proportional spool valve has a variable orifice size controllable by input voltage.

25. The trailing-edge flap actuator of claim 24, wherein said proportional spool valve is a 5/3-way valve for simultaneously depressurizing one of said fluid actuators while pressurizing the other of said fluid actuator.

26. The trailing-edge flap actuator of claim 22, comprising two control valves including a first control valve operatively engaged between said fluidic pressure source and said first fluid actuators, and a second control valve operatively engaged between said fluidic pressure source and said second fluid actuator.

27. The trailing-edge flap actuator of claim 26, wherein said first and second control valves each comprise a proportional spool valve.

28. The trailing-edge flap actuator of claim 27, wherein said proportional spool valves have a variable orifice size controllable by input voltage.

29. The trailing-edge flap actuator according to claim 13, wherein said second end of said first fluid actuator and said second end of said second fluid actuator are connected directly to a control valve.

30. The actuation system according to claim 13, wherein said fluidic pressure source is a compressed air source.

31. The actuation system according to claim 30, wherein said compressed air is generated in the fixed frame and transferred to the rotating frame for distribution to said fluid actuators through a slip ring.

32. The actuation system according to claim 30, wherein the compressed air is generated in the rotating frame for distribution to said fluid actuators.

* * * * *